United States Patent [19]

Hashimoto et al.

[11] Patent Number: 4,667,759

[45] Date of Patent: May 26, 1987

[54] POWER TRANSMISSION DEVICE OF MOTOR-DRIVEN POWER STEERING

[75] Inventors: Akio Hashimoto, Toyota; Tomio Yasuda, Kasukabe, both of Japan

[73] Assignee: Aisin Seiki Kabushiki Kaisha, Kariya, Japan

[21] Appl. No.: 759,001

[22] Filed: Jul. 25, 1985

[30] Foreign Application Priority Data

Jul. 25, 1984 [JP] Japan .................. 59-154689

[51] Int. Cl.$^4$ ............................................ F16H 35/00
[52] U.S. Cl. .................... 180/79.1; 180/148
[58] Field of Search .................. 180/79.1; 474/71, 73, 474/76, 85

[56] References Cited

U.S. PATENT DOCUMENTS

| | | | |
|---|---|---|---|
| 2,311,321 | 2/1943 | Zigan | 180/79.1 |
| 2,863,308 | 12/1958 | Flood | 464/71 |
| 3,222,885 | 12/1965 | Hein | 464/71 |
| 4,250,765 | 2/1981 | Niklaus. | |

Primary Examiner—John J. Love
Assistant Examiner—Donn McGiehan
Attorney, Agent, or Firm—Sughrue, Mion, Zinn Macpeak & Seas

[57] ABSTRACT

A power transmission device of a motor-driven power steering system is provided which comprises a driving gear mounted on the outside of a shaft transmitting a force given from a steering wheel to a steering mechanism and rotatable about the shaft, a first connecting member including at least one gear for coupling the driving gear and a driving shaft of an electric motor, a second connecting member coupled to one out of the shaft and the driving gear, and a buffering member having elasticity coupled to the other out of the shaft and the driving gear and to the second connecting member.

Preferably, the second connecting member has a cylindrical portion secured on the outside of the shaft and projections, and the driving gear has holes for receiving the buffering member and the projections.

5 Claims, 10 Drawing Figures

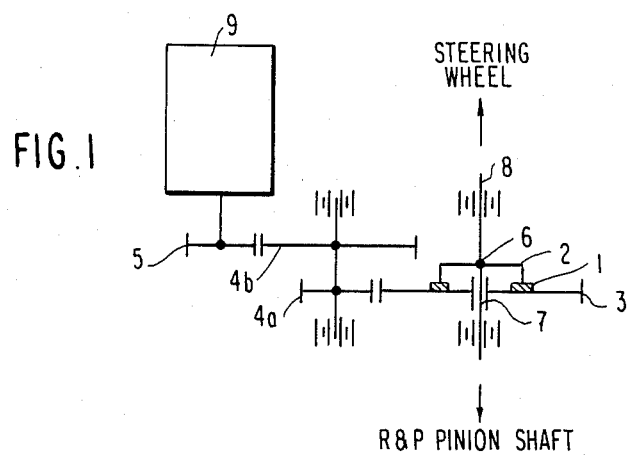
FIG.1
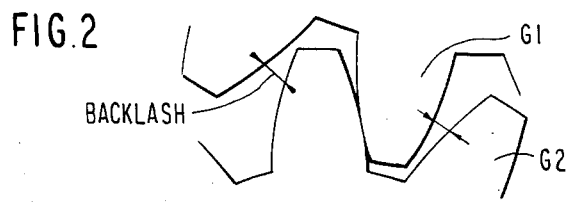
FIG.2
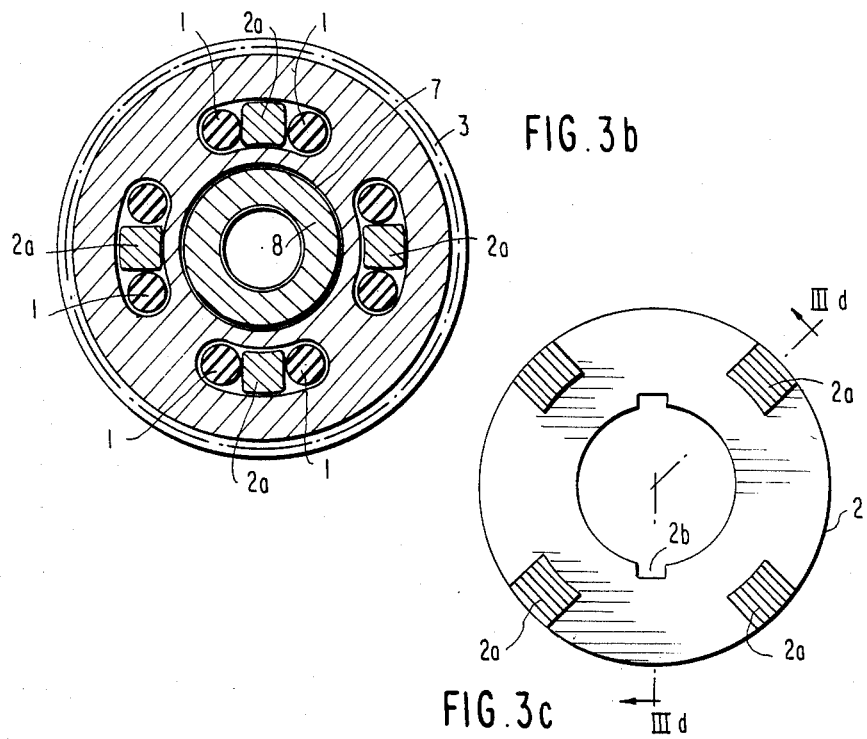
FIG.3b
FIG.3c

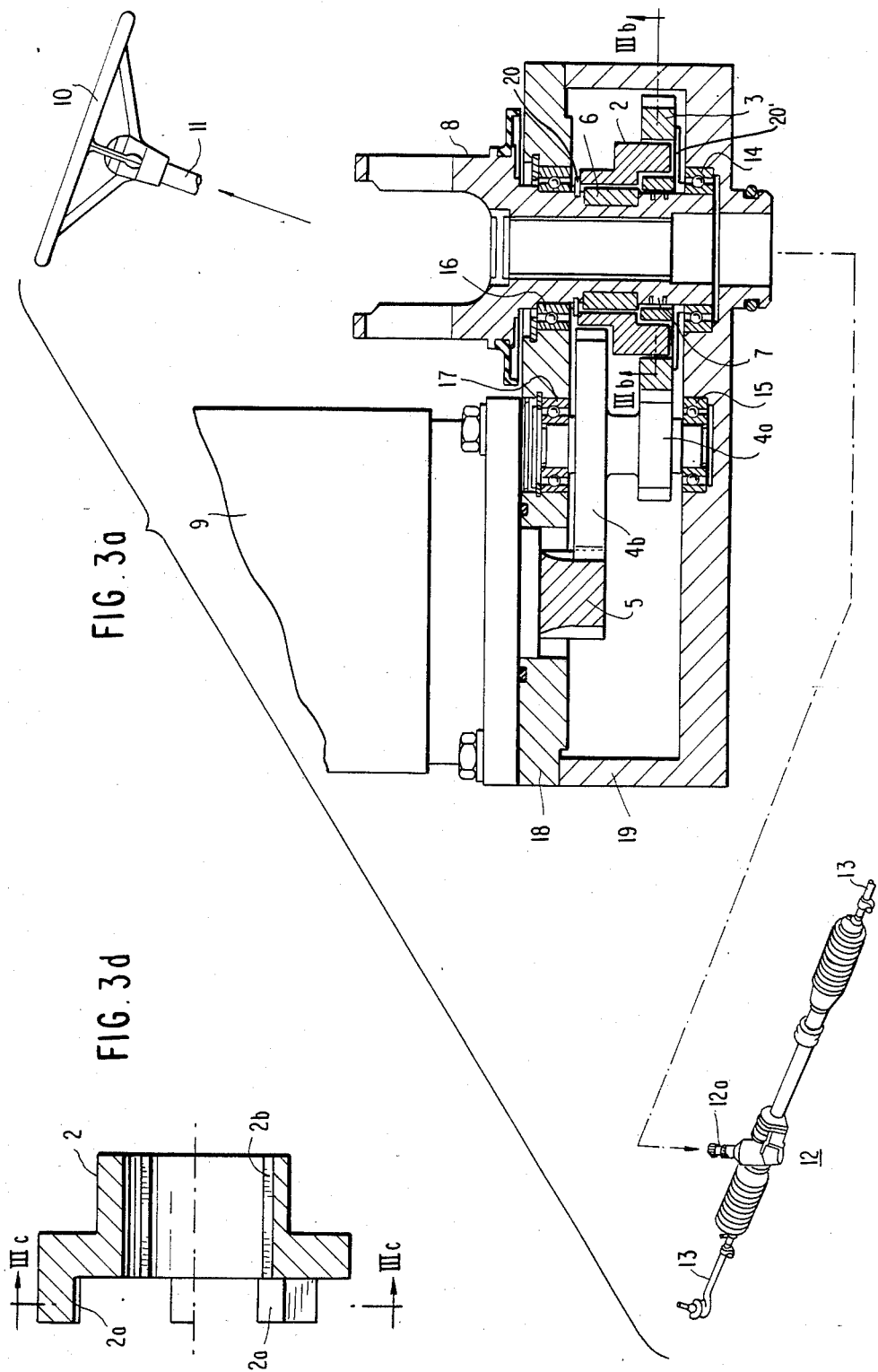

POWER TRANSMISSION DEVICE OF MOTOR-DRIVEN POWER STEERING

BACKGROUND OF THE INVENTION

1. Field of the Invention

This invention relates to a power transmission device of a motor-driven power steering system and, more particularly, to an improvement of feeling of steering on a device equipped with a reduction gear.

2. Description of the Prior Art

In relation to the device of the above type, one technique is disclosed in Japanese Patent Application Laid-Open No. 57-47251, in which an electric motor for generating a driving force and a steering shaft are coupled by means of a reduction gear equipped with a plurality of gears.

In the case of connecting driving systems by the use of gears as is the above type, backlash or gap normally exists between the gears as shown in FIG. 2. To eliminate backlash, the degree of precision of individual parts must be increased remarkably and a much time is required for adjustment on positioning. Accordingly, at the time of commencing driving of a device having backlash, a gear only on the driving side starts to rotate because a gear on the driven side is separated from the gear on the driving side. As it advances a certain extent the gear on the driving side collides with the gear on the driven side, and thereafter both gears on the driving side and driven side rotate together.

In the case of a motor-driven power steering system, because of train or gears as above is interposed between the electric motor and steering shaft, and it can be assumed that a gear on the side of the steering shaft, to which a force is applied from a steering wheel, functions as the driving side gear and a gear on the side of the electric motor as the driven side gear provided that the device stands in the off state, there occurs collision between the gears as soon as a driver starts to turn the steering wheel.

In case the device stands in the on state, it can be assumed that the gear on the side of the electric motor functions as the driving side gear and the gear on the side of the steering shaft as the driven side gear; accordingly, collision occurs between the gears immediately after the electric motor starts to rotate in response to operation of the steering wheel by the driver. After all, irrespective of the device being in the on state or off state, collision of gears ocurs immediately after operation of the steering wheel.

Due to this collision, a shock with a rap, i.e. a vibration, is transmitted via the steering shaft to the steering wheel. As a result, the driver feels unpleasant at the beginning of turning of a handle. Such a vibration could not be avoided on the conventional motor-driven power steering mechanism.

SUMMARY OF THE INVENTION

It is the object of the present invention to provide a power transmission device of a motor-driven power steering system which does not cause an unpleasant vibration at the beginning of turning of a handle.

In order to achieve the foregoing object, according to the present invention, a driving gear and a steering shaft are coupled via at least one buffering member having elasticity such as rubber and a connecting member of a definite shape.

By the foregoing arrangement, even if a vibration occurs due to backlash between gears of driving systems, such a vibration is absorbed by the buffering member and not transmitted to the steering shaft.

However, if the device is structured simply, the direction of a force applied to the buffering member varies widely depending upon shapes or positional relation of the connecting member and buffering member. Because the buffering member is generally weaker in mechanical strength than other members, if the direction in which a force is applied is not adequate, the buffering member tends to become worn or damaged within a short period of time and backlash could not be absorbed.

On the contrary, in accordance with the present invention, the connecting member is made cylindrical and fitted on the steering shaft, the connecting member is provided with a projection which is inserted in a hole formed in a driving gear, and the buffering member is disposed between the wall of the hole of the driving gear and the projection. By the foregoing structure, wear and damage of the buffering member can occur very rarely.

BRIEF DESCRIPTION OF THE DRAWINGS

FIG. 1 is a block diagram showing schematically an embodiment of the present invention;

FIG. 2 is a front view showing an exemplary gearing state of gears;

FIG. 3a is a vertical sectional view showing in detail the structure shown in FIG. 1;

FIG. 3b is a cross sectional view taken along line IIIb—IIIb in FIG. 3a;

FIG. 3c is a sectional view of a torque transmission joint 2 as viewed from the underside;

FIG. 3d is a cross sectional view taken along line IIId—IIId in FIG. 3c;

DETAILED DESCRIPTION OF THE PREFERRED EMBODIMENTS

Figure 4A:
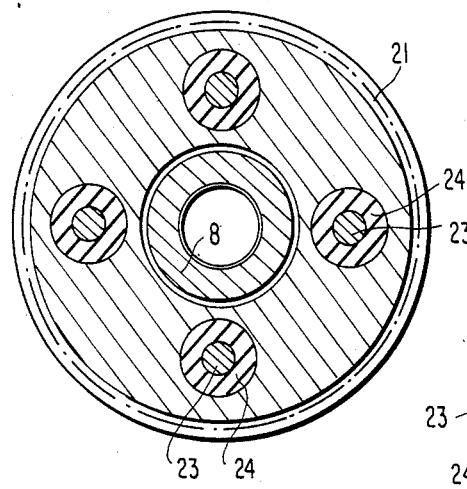
FIGS. 4a, 4b and 4c are views corresponding, respectively, to FIGS. 3b, 3c and 3d, showing a modification according to the present invention.

Embodiments of the present invention will now be described with reference to the drawings.

FIG. 1 illustrates schematically a mechanism section of a motor-driven power steering system, whose some portions are illustrated clearly in FIGS. 3a, 3b, 3c and 3d.

An outline of a manual steering mechanism or system will first be described. A steering shaft 11 coupled to the center portion of a steering wheel, i.e. handle 10 is coupled to a main shaft 8 via another shaft, joint, etc. not shown. The main shaft 8 forms a hollow joint itself, in which a pinion shaft 12a is inserted and coupled together. In the illustrated embodiment, to the output side of a rack and pinion (R&P) mechanism 12 including the pinion shaft 12a the rods 13 are coupled. Accordingly, as the steering wheel 10 is operated rotatively, in response thereto the tie rods 13 function, so that the direction of tires (not shown) is changed.

The power steering system will now be described with reference, particularly, to FIG. 3a. Reference numeral 9 indicates an electric motor for generating a driving force. To a driving shaft of the electric motor 9 a motor pinion gear 5 is secured. Reference numeral 4a indicates a first idler gear, 4b a second idler gear, and 3 a main shaft gear.

The first idler gear 4a and second idler gear 4b are made in a single body, whose supporting shaft is supported rotatably at both ends by bearings 15 and 17. The first idler gear 4a is in gear with the main shaft gear 3, whereas the second idler gear 4b is in gear with the motor pinion gear 5.

The main shaft 8 is supported rotatably by a housing composed of two members 18 and 19 via two bearings 14 and 16.

FIGS. 3c and 3d illustrate a connecting member, i.e. a torque transmission joint 2. As seen from FIGS. 3c and 3d, the torque transmission joint 2 has a cylindrical main portion and a flange formed at one end of the former, with the flange formed with four projections 2a. Referring to FIG. 3a, in the torque transmission joint 2 the main shaft 8 is inserted. Between a notch 2b formed in the inner wall of the cylinder of the torque transmission joint 2 and the outer wall of the main shaft 8 a fastening mechanism 6 is put, whereby the torque transmission joint 2 and main shaft are secured together for rotation.

FIG. 3b illustrates a cross-section along line IIIb—IIIb of FIG. 3a. Referring to FIG. 3b, in the main shaft gear 3 four arched holes are bored each of which has a size capable of receiving the projection 2a, and at substantially the center of each hole the corresponding one of projections 2a is inserted. In each hole of the main shaft gear 3 two columnar buffering members 1 are disposed so as to put the projection 2a therebetween. These buffering members 1 are produced by vulcanizing rubber. The main shaft gear 3 is supported at a hole bored in the center portion thereof by the main shaft 8 via a bearing 7. The axial position of the joint 2 and main gear 3 is fixed by spacers 20 and 20' to maintain gear 3 in proper meshing engagement with gear 4a.

Although in the illustrated embodiment the sectional shape of the projection 2a is substantially square and the sectional shape of the buffering member 1 is circular, these parts may take a circular, elliptical, square, or polygonal shape. Or, these parts may be shaped so as to harmonize with the shape of four holes of the main shaft gear 3 so that no gap can remain in the holes in the state wherein the projections 2a and buffering members 1 are disposed in the holes. The shape of four holes of the main shaft gear 3 may be circular, elliptical, square, or polygonal, and these holes may or may not pass through the main shaft gear 3 from one side to the other side. Further, the buffering member 1 may be stuck to the hole of the main shaft gear or the projection 2a, or both.

Figure 4B:
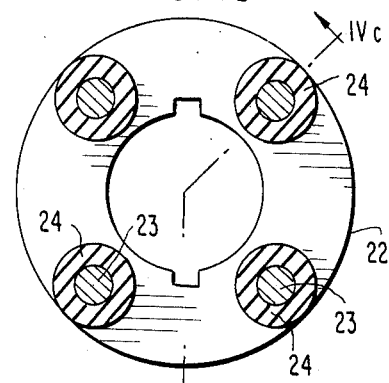
Figure 4C:
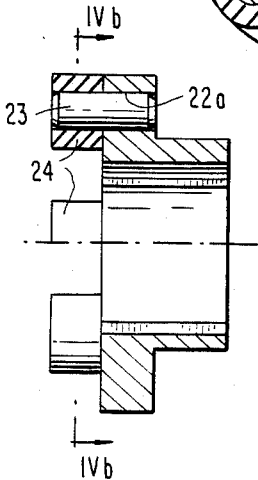

FIGS. 4a, 4b and 4c illustrate a modification of the foregoing embodiment. In this modified embodiment, columnar pawls 23 provided independent of a torque transmission joint 22 are employed as elements corresponding to the foregoing projections 2a, and these pawls 23 are fitted in four holes 22a formed in the flange of the torque transmission joint 22. A buffering member 24 is made cylindrical and fitted on a projecting portion of the pawl 23. Four holes of a main shaft gear 21 are circular such as to harmonize with the shape of the buffering members 24. Connection between the pawls 23 and the torque transmission joint 22 may be achieved by a process of press-fitting or welding. In case the pawls 23 are made in the form of an independent element as the above, individual parts become simple in shape; thus, machining can be achieved easily.

Figure 5:
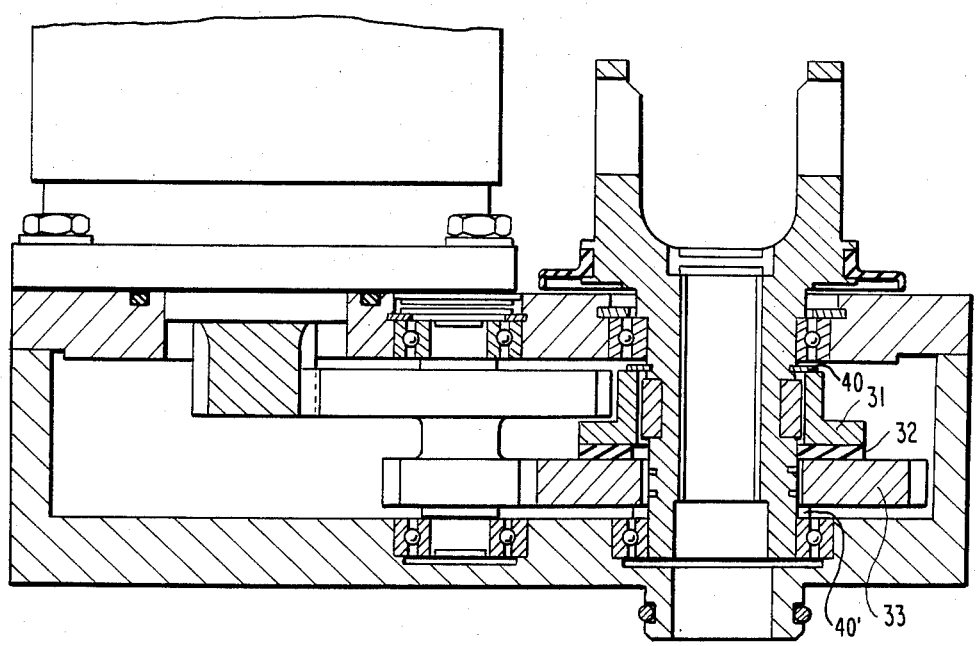
FIG. 5 is a vertical sectional view showing another embodiment of the present invention.

FIG. 5 illustrates another embodiment. Referring to FIG. 5, this embodiment has no coupling projection and no coupling hole in a torque transmission joint 31 and a main shaft gear 33, and the torque transmission joint 31 and main shaft gear 33 are coupled only by means of a frictional force exerted by a doughnut-like buffering member 32 pinched between the faces of the joint and gear. Although the buffering member 32 of this embodiment is made in the form of a doughnut, it may be a tetragonal or hexagonal sheet-like member with a hole bored in the center for passage of the main shaft 8, or be composed of a plurality of small buffering elements. Further, the buffering member 32 may be disposed in contact with the main shaft gear 8. The axial position of the transmission joint 31, the main shaft gear 33 and the buffering member 32 is fixedly maintained by spacers 40 and 40' to maintain the gear 33 in proper meshing engagement with the idler gear.

Although the embodiments use vulcanized rubber as the buffering member, in place thereof different means may be used, such as spring, or oil damper.

As is apparent from the foregoing description, the following effects can be obtained in accordance with the present invention:

(a) A shock tending to appear at the moment when reinforcement of steering is commenced by the driving force of the motor disappears. But, stiffness of the steering system does not deteriorate by application of the present invention.

(b) A noise of contact between the gears of the reduction gear is absorbed by the buffering members and does not reach the compartment.

(c) A play, particularly, backlash, of the gears is absorbed by the buffering members; thus, the degree of precision of respective mechanism is not necessary to be increased peculiarly, machining of parts becomes easy, and a variation in quality of products does not result.

(d) A variation of torque during the steering due to slot ripple of the electric motor becomes small, the feeling of steering is enhanced.

While the preferred embodiments have been described, variations thereto will occur to those skilled in the art within the scope of the present inventive concepts which are delineated by the following claims.

What is claimed is:

1. A power transmission device of a motor driven power steering system comprising:
   a steering shaft for transmitting a force from a steering wheel to a steering mechanism;
   a driving gear coaxially and rotatably mounted on said shaft;
   an electric motor;
   a first connecting member including at least one gear for coupling said driving gear and said electric motor;
   a second connecting member coaxially secured to said shaft adjacent said driving gear;
   coupling means including a rubber buffering member interposed between said driving gear and said second connecting member for transmitting torque from said electric motor to said steering shaft; and
   spacer means positioned on said shaft in engagement with said driving gear and said second connecting member to maintain said driving gear and second connecting member fixed against axial movement.

2. A power transmission device of a motor-driven power steering system as set forth in claim 1, wherein said second connecting member has a cylindrical portion secured on the outside of said shaft and a projection, and said driving gear has a hole for receiving said buffering member and said projection.

3. A power transmission device of a motor-driven power steering system as set forth in claim 2, wherein said projection is a rod member fitted in a hole formed in said second connecting member.

4. A power transmission device of a motor-driven power steering system as set forth in claim 1, wherein said second connecting member has a cylindrical portion secured on the outside of said shaft and a flange provided at one end of said cylindrical portion, and said buffering member is disposed and pinched between said flange and one end face of said driving gear.

5. A power transmission device of a motor-driven power steering system as set forth in claim 1, wherein said second connecting member has at least four projections arranged symmetrically with respect to said shaft, and said driving gear has four holes corresponding to said projections.

* * * * *